(12) United States Patent
Cole

(10) Patent No.: US 7,054,891 B2
(45) Date of Patent: May 30, 2006

(54) SYSTEM AND METHOD FOR COMPARING DATABASE DATA

(75) Inventor: Stephen Ray Cole, Elgin, TX (US)

(73) Assignee: BMC Software, Inc., Houston, TX (US)

( * ) Notice: Subject to any disclaimer, the term of this patent is extended or adjusted under 35 U.S.C. 154(b) by 423 days.

(21) Appl. No.: 10/100,518

(22) Filed: Mar. 18, 2002

(65) Prior Publication Data

US 2003/0177119 A1    Sep. 18, 2003

(51) Int. Cl.
G06F 12/00 (2006.01)
G06F 17/30 (2006.01)

(52) U.S. Cl. .......................................... 707/201; 707/10
(58) Field of Classification Search ........ 707/200–204, 707/10
See application file for complete search history.

(56) References Cited

U.S. PATENT DOCUMENTS

| | | | | |
|---|---|---|---|---|
| 5,261,092 A | * | 11/1993 | McLaughlin et al. | 709/400 |
| 5,475,625 A | * | 12/1995 | Glaschick | 709/224 |
| 5,497,486 A | * | 3/1996 | Stolfo et al. | 707/7 |
| 5,613,002 A | * | 3/1997 | Kephart et al. | 713/200 |
| 5,649,089 A | * | 7/1997 | Kilner | 714/6 |
| 5,666,526 A | * | 9/1997 | Reiter et al. | 707/2 |
| 5,668,897 A | * | 9/1997 | Stolfo | 382/283 |
| 5,680,611 A | * | 10/1997 | Rail et al. | 707/101 |
| 5,717,915 A | * | 2/1998 | Stolfo et al. | 707/5 |
| 5,765,172 A | * | 6/1998 | Fox | 707/204 |
| 5,778,395 A | * | 7/1998 | Whiting et al. | 707/204 |
| 5,898,836 A | * | 4/1999 | Freivald et al. | 709/218 |
| 5,974,574 A | * | 10/1999 | Lennie et al. | 714/52 |
| 6,006,354 A | * | 12/1999 | McGuinness | 714/758 |
| 6,240,409 B1 | * | 5/2001 | Aiken | 707/4 |
| 6,295,541 B1 | * | 9/2001 | Bodnar et al. | 707/203 |
| 6,393,438 B1 | * | 5/2002 | Kathrow et al. | 707/203 |
| 6,493,709 B1 | * | 12/2002 | Aiken | 707/4 |
| 6,529,917 B1 | * | 3/2003 | Zoltan | 707/201 |

(Continued)

OTHER PUBLICATIONS

Karp, R.M. and M.O. Rabin "Efficient Randomized Pattern-Matching Algorithms", IBM Journal of Res. Develop., vol. 31, No. 2, pp. 249-260, Mar. 1987.*

(Continued)

Primary Examiner—Luke S Wassum
(74) Attorney, Agent, or Firm—Wong, Cabello, Lutsch, Rutherford & Brucculeri, LLP

(57) ABSTRACT

An improved method and system for comparing database data. Data comparison may be performed either within a database or between two databases. Sets of cyclical redundancy check values may be created, at various points in time. Corresponding cyclical redundancy check values may be compared with each other to determine if the underlying data is different; differences may be displayed. Each cyclical redundancy check value may correspond to a user-determined amount of data within the database. The user-determined amount of data may be: (1) user-specified columns within one of the plurality of tables within the database; (2) a row within one of the plurality of tables within the database; (3) a table within the database; (4) the database in its entirety; or (5) any other subset of the database. A user-determined number of bytes corresponding to a user-determined subset of the user-determined amount of data may be stored for future use.

36 Claims, 5 Drawing Sheets

U.S. PATENT DOCUMENTS

| | | | |
|---|---|---|---|
| 6,553,388 B1* | 4/2003 | Perks | 707/201 |
| 6,581,074 B1* | 6/2003 | Wong et al. | 707/201 |
| 6,615,219 B1* | 9/2003 | Bruso et al. | 707/102 |
| 6,658,626 B1* | 12/2003 | Aiken | 715/526 |
| 6,675,152 B1* | 1/2004 | Prasad et al. | 705/64 |
| 6,732,122 B1* | 5/2004 | Zoltan | 707/201 |
| 6,738,757 B1* | 5/2004 | Wynne et al. | 707/3 |
| 6,757,675 B1* | 6/2004 | Aiken et al. | 707/3 |
| 2002/0035695 A1* | 3/2002 | Riches et al. | 713/193 |
| 2002/0107877 A1* | 8/2002 | Whiting et al. | 707/204 |
| 2003/0037020 A1* | 2/2003 | Novak et al. | 707/1 |
| 2003/0097382 A1* | 5/2003 | McDonald et al. | 707/204 |
| 2003/0172368 A1* | 9/2003 | Alumbaugh et al. | 717/106 |

OTHER PUBLICATIONS

BMC Software, Inc "Change Manager", downloaded from www.bmc.com, May 2002.*

Landry, M. and D. Moore "Getting the Most from PATROL DB-Change Manager™", downloaded from www.bmc.com, 2004.*

Stone, J., M. Greenwald, C, Partridge and J. Hughes "Performance of Checksums and CRC's over Real Data", IEEE/ACM Transactions on Networking, vol. 6, No. 5, Oct. 1998, pp. 529-543.*

* cited by examiner

SYSTEM AND METHOD FOR COMPARING DATABASE DATA

BACKGROUND OF THE INVENTION

1. Field of the Invention

The present invention relates to data comparisons, and more particularly to a system and method for comparing database data.

2. Description of the Related Art

In computer system environments where data is replicated, database administrators (DBA's) typically compare data using a variety of scripts, in order to test the success or failure of the data replication. This data comparison may compare sent data (i.e., data before any database operation occurs) to received data (i.e., data after database operations are completed). This data comparison may range from comparing a sub-set or sample of the data content before the data replication, or a generated value based on the sub-set or sample of the data content before the data replication with a corresponding sub-set or sample of the data content after the data replication, or a generated value based on the sub-set or sample of the data content after the data replication, to an exhaustive comparison of all of the sent or "before" data with all of the received or "after" data.

Examples of generated values include: a count of the number of rows, or a computation of average row length. When the generated value used to determine matching data is the count of the number of rows, the data comparison may be deemed successful, even in a case where the content of the rows is different, but the count of the number of the rows matches. The content of the rows may be different and the count of the number of the rows may match when one or more rows is deleted from the first set of data being compared and the same number of rows are inserted into the second set of data being compared. Similarly, a row length, or byte size, may match when the content is different. Thus using either a count of the number of rows or a computation of average row length as a basis for determining matching sets of data has a high probability of yielding incorrect comparisons.

An exhaustive comparison of data may be accomplished by sorting all the rows and comparing each piece of data, row by row. This method typically consumes large amounts of disk space and time to complete, especially for very large databases, and thus is a very slow, although typically very accurate method of comparing data.

The scripts that DBAs use to test the success or failure of a data replication are typically custom-made and typically require modifications, from time to time. The process of creating and maintaining data replication test scripts may be quite tedious, prone to error, and time-intensive.

Likewise, database operations that require data in a table to be unloaded from the database and subsequently reloaded into the database, (e.g., database reorganization, or a change to a column requiring a table to be rebuilt) are prone to error due to the complexities involved.

DBAs typically create and maintain custom-made scripts to test the success or failure of database operations that require data in a table to be unloaded from the database and subsequently reloaded into the database. Similar to the data replication test scripts noted above, the test scripts used to check the success or failure of load/unload database operations typically require modifications, from time to time. The process of creating and maintaining database load/unload test scripts may be quite tedious, prone to error, and time-intensive.

It is desirable to improve the process of comparing data to increase the likelihood that data replication and database operations complete successfully such that the time investment for DBAs to complete this task is diminished.

SUMMARY OF THE INVENTION

The present invention provides various embodiments of an improved method and system for comparing database data.

In one embodiment, data comparison within a database may be performed. The database may include a plurality of tables. A first plurality of cyclical redundancy check values may be created, based on the data in the plurality of tables within the database. The first plurality of cyclical redundancy check values may be created at a first point in time. The first plurality of cyclical redundancy check values may be stored in a first memory (e.g., a first data file).

Similarly, a second plurality of cyclical redundancy check values may be created, based on the data in the plurality of tables within the database. The second plurality of cyclical redundancy check values may be created at a second point in time. The second plurality of cyclical redundancy check values may be stored in a second memory (e.g., a second data file). Alternatively, the first memory and the second memory may be a single data file.

Each cyclical redundancy check value of the first plurality of cyclical redundancy check values may be compared with a corresponding cyclical redundancy check value of the second plurality of cyclical redundancy check values. Each cyclical redundancy check value of the first plurality of cyclical redundancy check values may correspond to a user-determined amount of data within the database. Similarly, each cyclical redundancy check value of the second plurality of cyclical redundancy check values may correspond to the user-determined amount of data within the database.

Differences between corresponding cyclical redundancy check values of the first plurality of cyclical redundancy check values and cyclical redundancy check values of the second plurality of cyclical redundancy check values may be displayed.

In various embodiments, the user-determined amount of data may be any one of the following: (1) user-specified columns within one of the plurality of tables within the database; (2) a row within one of the plurality of tables within the database; (3) a table within the database; (4) the database in its entirety. In addition, any other subset of the database, as determined by the user, may be specified as the user-determined amount of data.

A user-determined number of first bytes corresponding to a user-determined first subset of the user-determined amount of data at the first point in time may be stored in a third memory (e.g., a third data file). Similarly, a user-determined number of second bytes corresponding to a user-determined second subset of the user-determined amount of data at the second point in time may be stored in a fourth memory (e.g., a fourth data file).

In one embodiment, the displayed differences between corresponding cyclical redundancy check values of the first plurality of cyclical redundancy check values and cyclical redundancy check values of the second plurality of cyclical redundancy check values may be a user-determined subset of the user-determined number of first bytes and/or a user-determined subset of the user-determined number of second bytes.

Alternatively, rather than the first memory, the second memory, the third memory, and the fourth memory being four separate data files (e.g, a first data file, a second data file, a third data file, and a fourth data file, respectively), they may collectively be a single data file, or any combination of one or more data files.

In various embodiments, the user-determined first subset of the user-determined amount of data at the first point in time, as well as the user-determined second subset of the user-determined amount of data at the second point in time may correspond to the choice of the user-determined amount of data. Thus, if the user-determined amount of data is a row within one of the plurality of tables within the database, then the user-determined first subset of the user-determined amount of data at the first point in time may include one or more columns corresponding to the row, and the user-determined second subset of the user-determined amount of data at the second point in time may include one or more columns corresponding to the row.

In a similar manner, if the user-determined amount of data is a table within the database, then the user-determined first subset of the user-determined amount of data at the first point in time may include one or more rows corresponding to the table, and the user-determined second subset of the user-determined amount of data at the second point in time may include one or more rows corresponding to the table.

In another embodiment, if the user-determined amount of data is the database in its entirety, then the user-determined first subset of the user-determined amount of data at the first point in time may include one or more tables corresponding to the database, and the user-determined second subset of the user-determined amount of data at the second point in time may include one or more tables corresponding to the database.

As stated earlier, any other user-determined subset of the database may be specified as the user-determined amount of data. In this case, the user-determined first subset of the user-determined amount of data at the first point in time may include an appropriate corresponding subset of the database, and the user-determined second subset of the user-determined amount of data at the second point in time may include an appropriate corresponding subset of the database.

In one embodiment, data comparison of first data in a first database with second data in a second database may be performed. The description above referring to data comparison within a database at a first point in time and at a second point in time may be modified to cover the case of two separate databases at a first point in time and at a second point in time. A detailed description of data comparison involving two separate databases is provided below.

BRIEF DESCRIPTION OF THE DRAWINGS

A better understanding of the present invention can be obtained when the following detailed description of various embodiments is considered in conjunction with the following drawings, in which.

Figure 1:
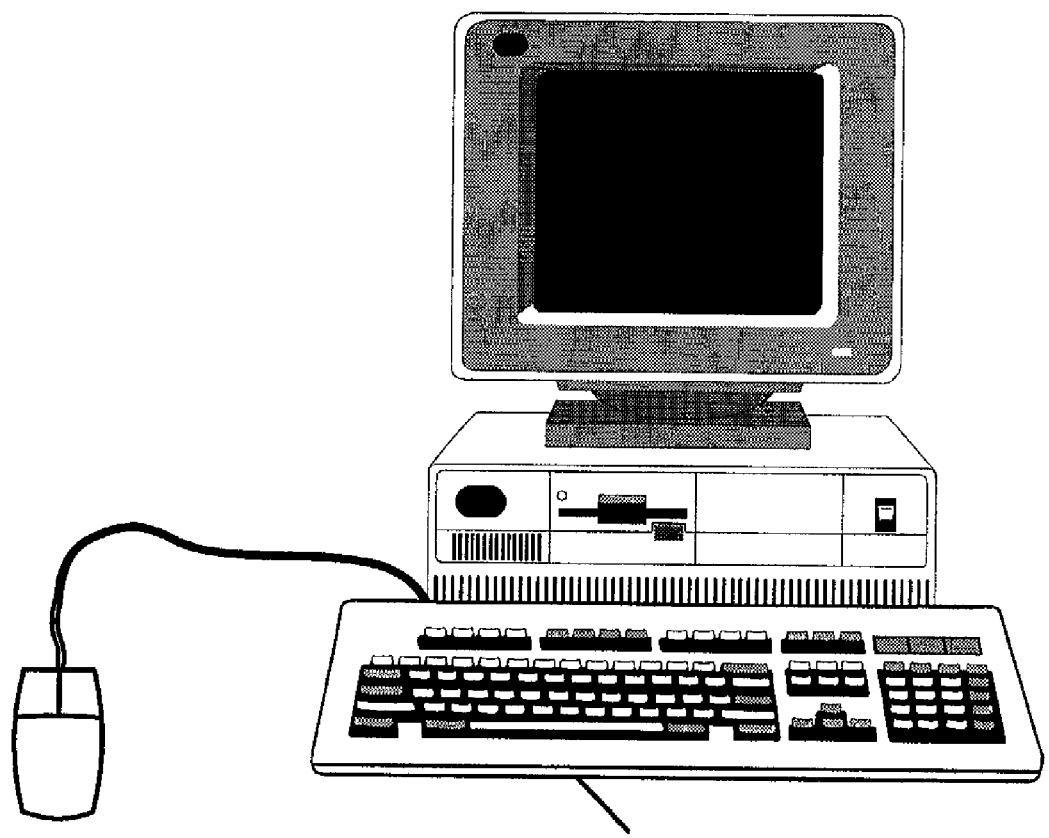
FIG. 1 illustrates an exemplary first computer system according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1—First Computer System

FIG. 1 illustrates a first computer system 6 operable to execute a database data comparison process. Several embodiments of systems and methods comparing database data (e.g., within a single database or between two separate databases) are described below. The first computer system 6 may be any type of computer system, including a personal computer system, mainframe computer system, workstation, network appliance, Internet appliance, personal digital assistant (PDA), television system or other device. In general, the term "computer system" may be broadly defined to encompass any device having at least one processor that executes instructions from a memory medium.

As shown in FIG. 1, the first computer system 6 may include a display device operable to display operations associated with the database data comparison process. The display device may also be operable to display a graphical user interface for use in the database data comparison process. The graphical user interface may comprise any type of graphical user interface, e.g., depending on the computing platform.

The first computer system 6 may include a memory medium(s) on which one or more computer programs or software components according to one embodiment of the present invention may be stored. For example, the memory medium may store one or more database data comparison software programs which are executable to perform the methods described herein. Also, the memory medium may store a programming development environment application used to create and/or execute database data comparison software programs. The memory medium may also store operating system software, as well as other software for operation of the computer system.

The term "memory medium" is intended to include various types of memory or storage, including an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory or storage as well, or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution.

Figure 2:
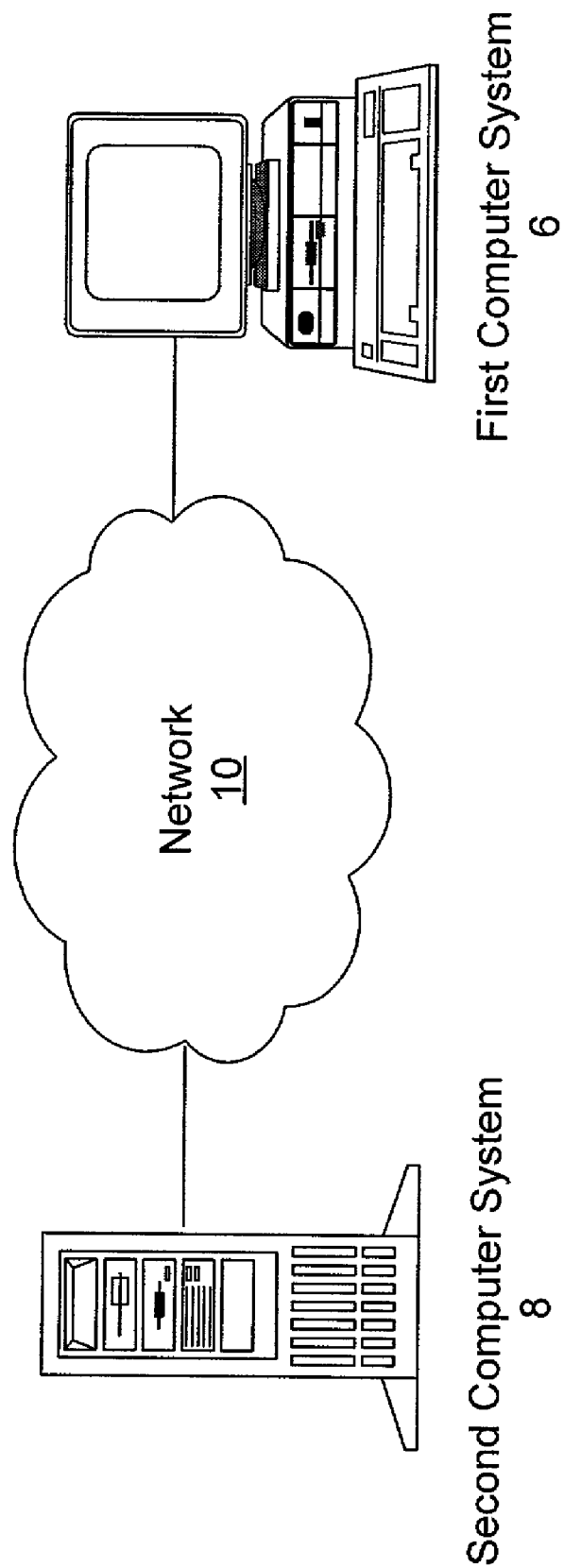
FIG. 2 illustrates a network connecting the first computer system and a second computer system according to one embodiment of the present invention.

FIG. 2—A Network with Two Computer Systems

FIG. 2 illustrates a simplified and exemplary network that operates according to one embodiment of the present invention. As shown in the network of FIG. 2, the first computer system 6 is connected to the second computer system 8 through network 10. The network 10 may be any of various types of wide-area networks and/or local area networks, or networks of networks, such as the Internet, which connects computers and/or networks of computers together, thereby providing the connectivity for enabling various computer systems to communicate. Thus, the network 10 may be any of various types of networks, including wired networks, wireless networks, or any other type of network of computer systems.

Although not shown, a database may be coupled to or comprised in one or both of the first computer system 6 and the second computer system 8. Alternatively, or in addition, a separate database server computer system may be coupled to the network 10, wherein the separate database server computer system includes a database (not shown). The database and/or database server computer system may store information.

It is noted that the computer systems in FIG. 2 are exemplary computer systems. Thus, various different embodiments of computer systems may also be used, as desired. The computer systems shown in FIG. 2 may be implemented using one or more computer systems, e.g., a single server or a number of distributed servers, connected in various ways, as desired.

Each of the computer systems in FIG. 2 may include various standard components such as one or more processors or central processing units and one or more memory media, and other standard components, e.g., a display device, input devices, a power supply, etc. Each of the computer systems in FIG. 2 may also be implemented as two or more different computer systems.

At least one of the computer systems in FIG. 2 preferably includes a memory medium on which computer programs are stored. Also, the computer systems in FIG. 2 may take various forms, including a computer system, mainframe computer system, workstation, or other device. In general, the term "computer server" or "server" may be broadly defined to encompass any device having a processor that executes instructions from a memory medium.

The memory medium may store a software program for implementing the data comparison process. The software program may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. A CPU of one of the computer systems shown in FIG. 2 executing code and data from the memory medium comprises a means for implementing the data comparison process according to the methods or flowcharts described below.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Figure 3:
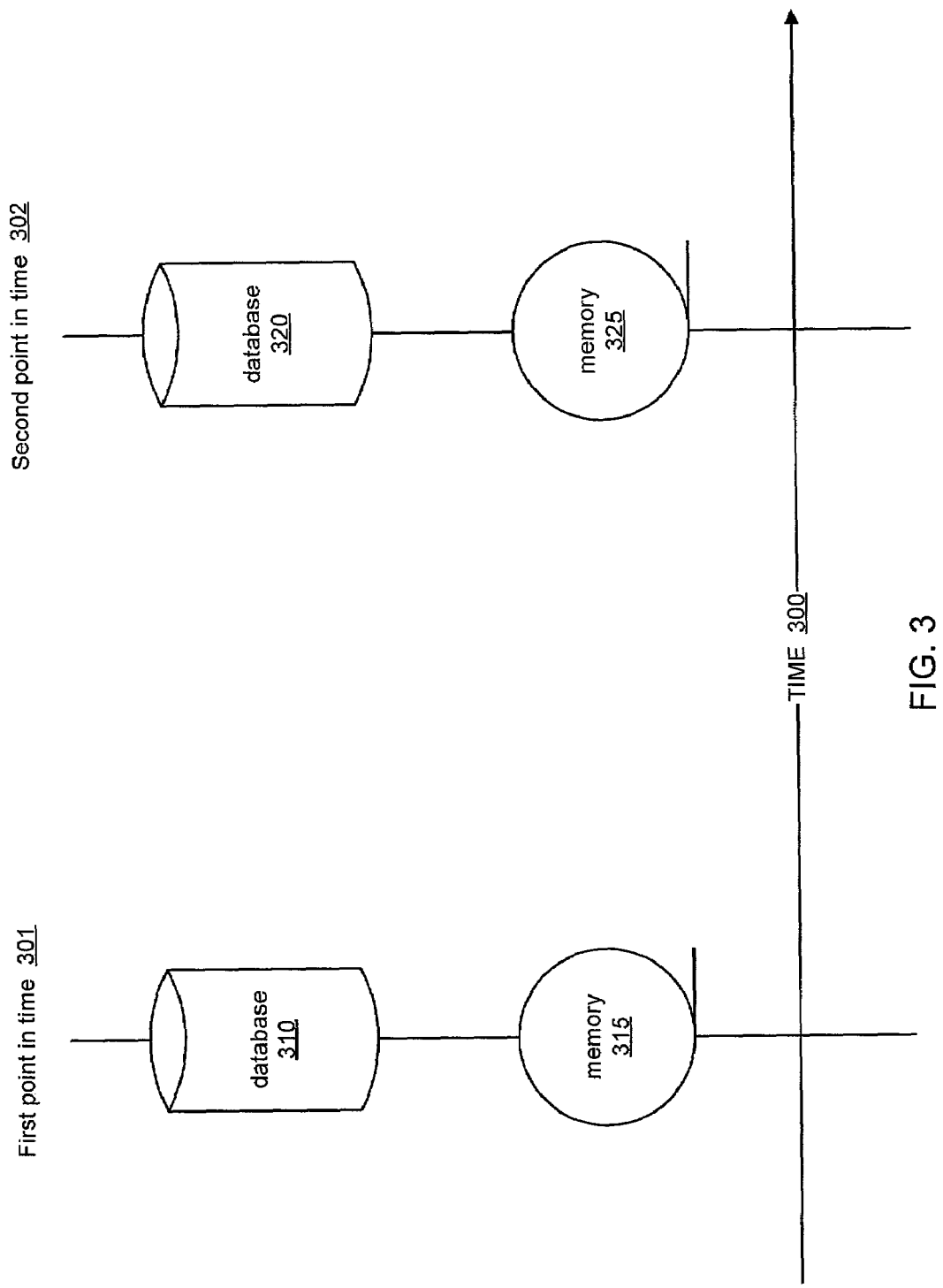
FIG. 3 is a block diagram illustrating data comparison between two databases according to one embodiment of the present invention.

FIG. 3—Data Comparison Between Two Databases

FIG. 3 is a block diagram illustrating data comparison between two databases according to one embodiment of the present invention.

The passage of time is indicated by the time line 300. As shown in FIG. 3, two points in time (i.e., first point in time 301 and second point in time 302) are indicated to illustrate an embodiment of the invention. The user may specify when both the first point in time 301 and the second point in time 302 occur, as desired. In one embodiment, the user may specify the first point in time 301 and a time interval to wait before the second point in time 302 occurs, as opposed to specifying the first point in time 301 and the second point in time 302. Any other calculation may be used, to determine the first point in time 301 and the second point in time 302, as desired.

At the first point in time 301, database 310 and memory 315 are shown. As described more fully under FIG. 5 below, a first plurality of cyclical redundancy check values may be created, based on first data in the first plurality of tables within database 310. The first plurality of cyclical redundancy check values may be created at first point in time 301. The first plurality of cyclical redundancy check values may be stored in a first memory (e.g., memory 315).

At the second point in time 302, database 320 and memory 325 are shown. Similar to the description above regarding database 310 and memory 315, a second plurality of cyclical redundancy check values may be created, based on second data in the second plurality of tables within database 320. The second plurality of cyclical redundancy check values may be created at second point in time 302. The second plurality of cyclical redundancy check values may be stored in a second memory (e.g., memory 325).

As used herein, a Cyclical Redundancy Check (CRC) is a calculated value (e.g., a check number) based on input data. CRCs may be useful tools in error-checking procedures for binary data, to check if the data has been altered (e.g., after being sent through some communication channel). Examples of uses for CRCs include, but are not limited to: (1) comparing "before" data and "after" data within a single database after a given operation or set of operations is completed (e.g., a reorganization of that database, or an unload/load operation on that database) to determine rows of data that have changed; (2) comparing "before" data and "after" data within a single database after a period of time has passed to determine rows of data that have changed; (3) comparing "sent" data and "received" data from a sending computer system and a receiving computer system, respectively, to determine the success or failure of the data transmission (e.g., between two databases).

Different methods exist for calculating CRCs. For example, the International Telecommunications Union-Telecommunications Standardization Section (ITU-TSS) CRC is often written as a formula: $G(x)=x^{16}+x^{12}+x^5+1$. Characteristic of the ITU-TSS CRC is its 16 bit size and its initial value $FFFF, although you can encounter an initial value $0000, too. The ITU-TSS has also defined a 32-bit CRC. The formula for the 32-bit ITU-TSS CRC is often written as: $G(x)=x^{26}+x^{23}+x^{22}+x^{16}+x^{12}+x^{11}+x^{10}+x^8+x^7+x^5+x^4+x^2+x^1+1=0$ Below is a source code example for calculating the 32-bit CRC.

```
unsigned long crc = 0xFFFFFFFF;
unsigned char byte = 0x5A;
unsigned short index;
crc   = byte << 24;
for (index = 0; index <= 7; index++)
    {
        crc = crc & 0x80000000 ? (crc << 1) ^ 0x04C11DB7 : crc << 1;
    }
```

Of course, the bit size of the CRC (e.g., 16, 32, 64, 128, etc.) may be user specified. The purpose of the CRC is to compute a unique value for each unique input data being compared.

Determination of the amount of data considered as input data for the calculation of a single CRC value may be user-determined. For example, at a high level, a single CRC value may be computed for an entire database. More commonly, multiple CRC values are computed (e.g., on a table or row or column basis) for a database.

In the single database case, two sets of one or more complex mathematical calculations may be performed on the input data, based on the user-determined amount of data considered as input data (i.e., the entire database, each table of the database, each row in each table of the database, each column in each row of each table of the database, etc.). Thus, each set of calculations may result in one or more CRCs or CRC values being generated. The first set of CRC values may be calculated "before" a user-determined action or series of actions or period of time begins. The second set of CRC values may be calculated "after" the user-determined action or series of actions or period of time ends.

The first set of CRC values may be compared or "diffed" with the second set of CRC values. In one embodiment, this comparison or "diff" action may result in both the first set of CRC values and the second set of CRC values being modified such that CRC values having a match in both sets are removed. Thus, any CRC values remaining in the modified versions of the first set of CRC values and the second set of CRC values indicate corresponding input data that does not match.

In the case of two computer systems or two databases, a single compare process may be used on a computer system wherein the single compare process may communicate with the two databases (e.g., a first database and a second database). The first database may reside on the same computer system as the single compare process, or on a second (i.e., remote) computer system. Similarly, the second database may reside on the same computer system as the single compare process, on the second computer system (i.e., the same computer system as the first database), or on a third (i.e., remote) computer system. The single compare process may retrieve data from the two databases. The single compare process may perform complex mathematical calculations, generating numbers based upon the data being received from the two databases. The generated number may be referred to as a CRC value or simply a CRC. The CRCs for the two databases may be compared to determine if differences exist between the two databases.

Alternatively, in the case of two computer systems or two databases, the sending computer system may perform a complex mathematical calculation, generating a number based upon the data being transmitted, and may send that generated number to the receiving computer system, along with the data. The generated number may be referred to as a CRC value or simply a CRC. The receiving computer system may perform the same calculation after transmission. If the results match (i.e., if the CRC value computed for the sending computer system is the same value as the CRC value computed for the receiving computer system), then the transmission succeeds; otherwise, (i.e., if the results do not match), it means the message was received in an altered state, and the data may be incorrect. In one embodiment, the receiving computer system may request retransmission of the data from the sending computer system, if the results do not match. Alternate scenarios (e.g., the receiving computer system sending a message to the sending computer system upon successful transmission only, or the receiving computer system sending a message to the sending computer system upon both successful transmissions and failed transmissions, among others) of messages being sent between the sending computer system and the receiving computer system may be used, as desired.

Figure 4:
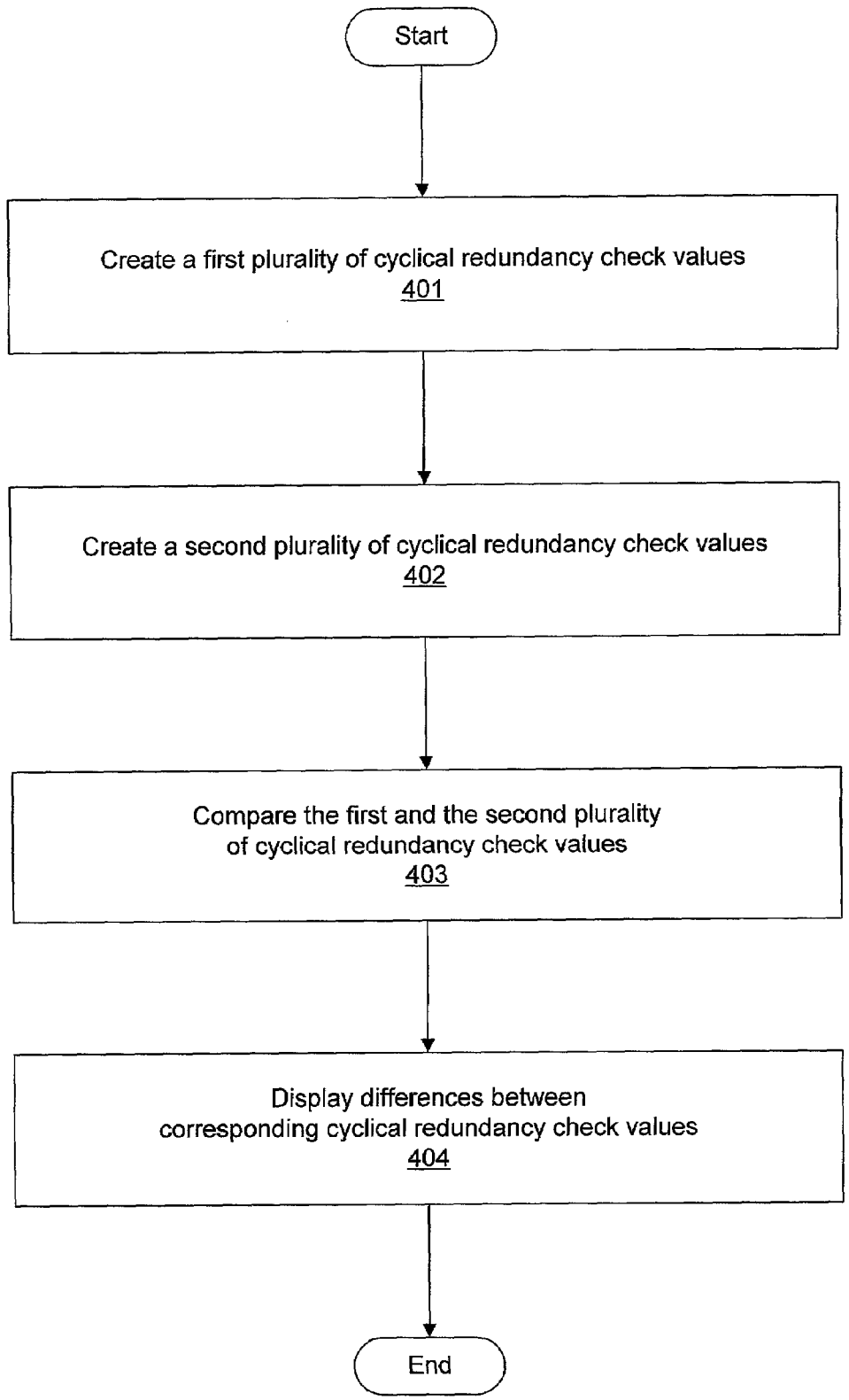
FIG. 4 is a flowchart illustrating data comparison within a database according to one embodiment of the present invention.

FIG. 4—Data Comparison Within a Database

FIG. 4 is a flowchart of an embodiment of a system and method for data comparison within a database.

In step 401, a first plurality of cyclical redundancy check values may be created, based on the data in the plurality of tables within the database. The first plurality of cyclical redundancy check values may be created at a first point in time. The first plurality of cyclical redundancy check values may be stored in a first memory (e.g., a first data file).

Similarly, in step 402, a second plurality of cyclical redundancy check values may be created, based on the data in the plurality of tables within the database. The second plurality of cyclical redundancy check values may be created at a second point in time. The second plurality of cyclical redundancy check values may be stored in a second memory (e.g., a second data file). Alternatively, the first memory and the second memory may be a single data file.

In step 403, each cyclical redundancy check value of the first plurality of cyclical redundancy check values may be compared with a corresponding cyclical redundancy check value of the second plurality of cyclical redundancy check values. In one embodiment, the first point in time and the second point in time may be the same point in time, or may be very close in time (e.g., separate by seconds or minutes). Thus, the comparison may be done in parallel with the creation of the first plurality of cyclical redundancy check values and the creation of the second plurality of cyclical redundancy check values. One benefit of comparing corresponding cyclical redundancy check values in parallel with creating the first plurality of cyclical redundancy check values and the second plurality of cyclical redundancy check values is that memory usage may be reduced: as matches are found, the matched CRC values may be removed from the sets (i.e., from the first plurality of cyclical redundancy check values and from the second plurality of cyclical redundancy check values).

In step 404, differences between corresponding cyclical redundancy check values of the first plurality of cyclical redundancy check values and cyclical redundancy check values of the second plurality of cyclical redundancy check values may be displayed.

Each cyclical redundancy check value of the first plurality of cyclical redundancy check values may correspond to a user-determined amount of data within the database. Similarly, each cyclical redundancy check value of the second plurality of cyclical redundancy check values may correspond to the user-determined amount of data within the database.

In various embodiments, the user-determined amount of data may be any one of the following: (1) user-specified columns within one of the plurality of tables within the database; (2) a row within one of the plurality of tables within the database; (3) a table within the database; (4) the database in its entirety. In addition, any other subset of the database, as determined by the user, may be specified as the user-determined amount of data.

A user-determined number of first bytes corresponding to a user-determined first subset of the user-determined amount of data at the first point in time may be stored in a third memory (e.g., a third data file). Similarly, a user-determined number of second bytes corresponding to a user-determined second subset of the user-determined amount of data at the second point in time may be stored in a fourth memory (e.g., a fourth data file).

In one embodiment, the displayed differences between corresponding cyclical redundancy check values of the first plurality of cyclical redundancy check values and cyclical redundancy check values of the second plurality of cyclical redundancy check values may be a user-determined subset of the user-determined number of first bytes and/or a user-determined subset of the user-determined number of second bytes.

Alternatively, rather than the first memory, the second memory, the third memory, and the fourth memory being four separate data files (e.g, a first data file, a second data file, a third data file, and a fourth data file, respectively), they may collectively be a single data file, or any combination of one or more data files.

In various embodiments, the user-determined first subset of the user-determined amount of data at the first point in time, as well as the user-determined second subset of the user-determined amount of data at the second point in time may correspond to the choice of the user-determined amount of data. Thus, if the user-determined amount of data is a row within one of the plurality of tables within the database, then the user-determined first subset of the user-determined amount of data at the first point in time may include one or more columns corresponding to the row, and the user-determined second subset of the user-determined amount of data at the second point in time may include one or more columns corresponding to the row.

In a similar manner, if the user-determined amount of data is a table within the database, then the user-determined first subset of the user-determined amount of data at the first point in time may include one or more rows corresponding to the table, and the user-determined second subset of the user-determined amount of data at the second point in time may include one or more rows corresponding to the table.

In another embodiment, if the user-determined amount of data is the database in its entirety, then the user-determined first subset of the user-determined amount of data at the first point in time may include one or more tables corresponding to the database, and the user-determined second subset of the user-determined amount of data at the second point in time may include one or more tables corresponding to the database.

As stated earlier, any other user-determined subset of the database may be specified as the user-determined amount of data. In this case, the user-determined first subset of the user-determined amount of data at the first point in time may include an appropriate corresponding subset of the database, and the user-determined second subset of the user-determined amount of data at the second point in time may include an appropriate corresponding subset of the database.

Figure 5:
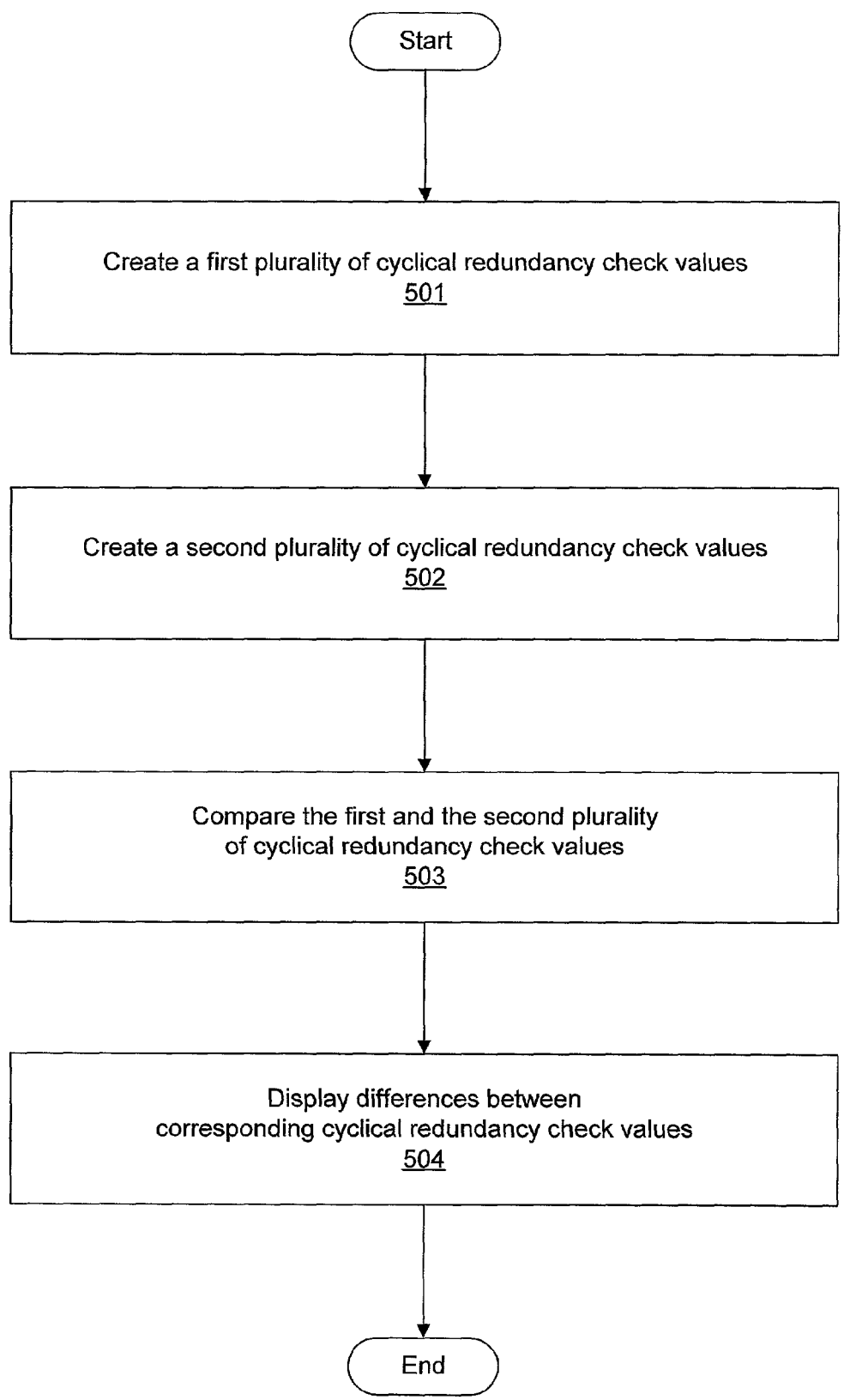
FIG. 5 is a flowchart illustrating data comparison between two databases according to one embodiment of the present invention.

FIG. 5—Data Comparison Between Two Databases

FIG. 5 is a flowchart illustrating data comparison between two databases according to one embodiment of the present invention.

In step 501, a first plurality of cyclical redundancy check values may be created, based on first data in the first plurality of tables within the first database. The first plurality of cyclical redundancy check values may be created at a first point in time. The first plurality of cyclical redundancy check values may be stored in a first memory (e.g., a first data file).

Similarly, in step 502, a second plurality of cyclical redundancy check values may be created, based on second data in the second plurality of tables within the second database. The second plurality of cyclical redundancy check values may be created at a second point in time. The second plurality of cyclical redundancy check values may be stored in a second memory (e.g., a second data file). Alternatively, the first memory and the second memory may be a single data file.

In step 503, each cyclical redundancy check value of the first plurality of cyclical redundancy check values may be compared with a corresponding cyclical redundancy check value of the second plurality of cyclical redundancy check values. In one embodiment, the first point in time and the second point in time may be the same point in time, or may be very close in time (e.g., separate by seconds or minutes). Thus, the comparison may be done in parallel with the creation of the first plurality of cyclical redundancy check values and the creation of the second plurality of cyclical redundancy check values. One benefit of comparing corresponding cyclical redundancy check values in parallel with creating the first plurality of cyclical redundancy check values and the second plurality of cyclical redundancy check values is that memory usage may be reduced: as matches are found, the matched CRC values may be removed from the sets (i.e., from the first plurality of cyclical redundancy check values and from the second plurality of cyclical redundancy check values).

In step 504, differences between corresponding cyclical redundancy check values of the first plurality of cyclical redundancy check values and cyclical redundancy check values of the second plurality of cyclical redundancy check values may be displayed.

Each cyclical redundancy check value of the first plurality of cyclical redundancy check values may correspond to a first user-determined amount of first data within the first database. Similarly, each cyclical redundancy check value of the second plurality of cyclical redundancy check values may correspond to a second user-determined amount of second data within the second database.

In various embodiments, the first user-determined amount of first data may be any one of the following: (1) a row within one of the first plurality of first tables within the first database; (2) a table within the first database; (3) the first database in its entirety. In addition, any other subset of the first database, as determined by the user, may be specified as the user-determined amount of first data. Similarly, in various embodiments, the second user-determined amount of second data may be any one of the following: (1) a row within one of the second plurality of second tables within the second database; (2) a table within the second database; (3) the second database in its entirety. In addition, any other subset of the second database, as determined by the user, may be specified as the user-determined amount of second data.

A user-determined number of first bytes corresponding to a user-determined first subset of the first user-determined amount of first data at the first point in time may be stored in a third memory (e.g., a third data file). Similarly, a user-determined number of second bytes corresponding to a user-determined second subset of the second user-determined amount of second data at the second point in time may be stored in a fourth memory (e.g., a fourth data file).

In one embodiment, the displayed differences between corresponding cyclical redundancy check values of the first plurality of cyclical redundancy check values and cyclical redundancy check values of the second plurality of cyclical redundancy check values may be a user-determined subset of the user-determined number of first bytes and/or a user-determined subset of the user-determined number of second bytes.

Alternatively, rather than the first memory, the second memory, the third memory, and the fourth memory being four separate data files (e.g, a first data file, a second data file, a third data file, and a fourth data file, respectively), they may collectively be a single data file, or any combination of one or more data files.

In various embodiments, the user-determined first subset of the first user-determined amount of first data at the first point in time, as well as the user-determined second subset of the second user-determined amount of second data at the second point in time may correspond to the choices of the first user-determined amount of first data and the second user-determined amount of second data, respectively. Thus, if the first user-determined amount of first data is a row within one of the first plurality of first tables within the first database, then the user-determined first subset of the first user-determined amount of first data at the first point in time may include one or more columns corresponding to the row. Similarly, if the second user-determined amount of second data is a row within one of the second plurality of second tables within the second database, then the user-determined second subset of the second user-determined amount of second data at the second point in time may include one or more columns corresponding to the row.

As another example, if the first user-determined amount of first data is a table within the first database, then the user-determined first subset of the first user-determined amount of first data at the first point in time may include one or more rows corresponding to the table. Similarly, if the second user-determined amount of second data is a table within the second database, then the user-determined second subset of the second user-determined amount of second data at the second point in time may include one or more rows corresponding to the table.

In another embodiment, if the first user-determined amount of first data is the first database in its entirety, then the user-determined first subset of the first user-determined amount of first data at the first point in time may include one or more tables corresponding to the first database. Similarly, if the second user-determined amount of second data is the second database in its entirety, then the user-determined second subset of the second user-determined amount of second data at the second point in time may include one or more tables corresponding to the second database.

As stated earlier, any other user-determined subset of the database may be specified as the user-determined amount of data. This applies to the user-determined first subset of the first database as well as the user-determined second subset of the second database. In this case, the user-determined first subset of the first user-determined amount of first data at the first point in time may include an appropriate corresponding subset of the first database. Similarly, the user-determined second subset of the second user-determined amount of second data at the second point in time may include an appropriate corresponding subset of the second database.

Various embodiments further include receiving or storing instructions and/or data implemented in accordance with the foregoing description upon a carrier medium. Suitable carrier mediums include storage mediums or memory mediums such as magnetic or optical media, e.g., disk or CD-ROM, as well as signals such as electrical, electromagnetic, or digital signals, conveyed via a communication medium such as a network and and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method executed by a computer system for comprising database data, comprising:
    receiving a first determination by a user of first and second portions of database data, the first determination of the portions being specifiable by the user;
    selecting the user-determined first portion of database data at a first time, the first portion comprising less than all the database data;
    generating a first set of cyclical redundancy check values based directly on the first portion of database data;
    selecting the user-determined second portion of database data at a second time, the second portion comprising less than all the database data;
    generating second set of cyclical redundancy check values based directly on the second portion of database data;
    comparing each cyclical redundancy check value in the first set of cyclical redundancy check values with a corresponding cyclical redundancy check value in the second set of cyclical redundancy check values;
    receiving a second determination by a user of a first subset of the first portion and a second subset of the second portion of database data, the second determination of the subsets being specifiable by the user;
    selecting the first subset of the first portion of database data;
    selecting the second subset of the second portion of database data; and
    displaying to the user the selected first and second subsets of database data along with differences between corresponding cyclical redundancy check values in the first and second sets.

2. The method of claim 1, wherein the database data comprises an entire database.

3. The method of claim 2, wherein the entire database comprises a plurality of database tables, each table having one or more rows and one or more columns.

4. The method of claim 3, wherein the first and second portions comprise a column in one of the plurality of database tables.

5. The method of claim 3, wherein the first and second portions comprise one of the plurality of database tables.

6. The method of claim 3, wherein the first and second portions comprise a row in one of the plurality of database tables.

7. The method of claim 3, wherein the first and second portions comprise one or more rows from a first table and one or more rows from a second table.

8. The method of claim 3, wherein the first and second portions comprise one or more columns from a first table and one or more columns from a second table.

9. The method of claim 3, wherein the first and second portions comprise one or more columns and one or more rows from one of the plurality of database tables.

10. The method of claim 3, wherein the first and second portions comprise one or more columns and one or more rows from one or more of the plurality of database tables.

11. The method of claim 1, wherein the first portion of database data comprises database data in a first database, and wherein the second portion of database data comprises database data in a second database.

12. The method of claim 11, wherein the second database comprises a snapshot of the first database.

13. A system for comparing database data on a network, comprising:
   a CPU coupled to the network;
   a memory coupled to the CPU which stores the database data; and
   a persistent memory coupled to the CPU, wherein the persistent memory stores one or more computer programs executable by the CPU;
   wherein the computer programs are executable to:
   receive a first determination by a user of first and second portions of database data, the first determination of the portions being specifiable by the user;
   select the user-determined first portion of database data at a first time, the first portion comprising less than all the database data;
   generate a first set of cyclical redundancy check values based directly on the first portion of database data;
   select the user-determined second portion of database data at a second time, the second portion comprising less than all the database data;
   generate a second set of cyclical redundancy check values based directly on the second portion of database data;
   compare each cyclical redundancy check value in the first set of cyclical redundancy check values wit a corresponding cyclical redundancy check value in the second set of cyclical redundancy check values;
   receive a second determination by a user of a first subset of the first portion and a second subset of the second portion of database data, the second determination of the subsets being specifiable by the user;
   select the first subset of the first portion of database data;
   select the second subset of the second portion of database data; and
   display to the user the selected first and second subsets of database data along with differences between corresponding cyclical redundancy check values in the first and second sets.

14. The system of claim 13, wherein the database data comprises an entire database.

15. The system of claim 14, wherein the entire database comprises a plurality of database tables, each table having one or more rows and one or more columns.

16. The system of claim 14, wherein the first and second portions comprise a column in one of the plurality of database tables.

17. The system of claim 14, wherein the first and second portions comprise one of the plurality of database tables.

18. The system of claim 14, wherein the first and second portions comprise a row in one of the plurality of database tables.

19. The system of claim 14, wherein the first and second portions comprise one or more rows from a first table and one or more rows from a second table.

20. The system of claim 14, wherein the first and second portions comprise one or more columns from a first table and one or more columns from a second table.

21. The system of claim 14, wherein the first and second portions comprise one or more columns and one or more rows from one of the plurality of database tables.

22. The system of claim 14, wherein the first and second portions comprise one or more columns and one or more rows from one or more of the plurality of database tables.

23. The system of claim 13, wherein the first portion of database data comprises first data in a first database, and wherein the second portion of database data comprises second data in a second database.

24. The system of claim 23, wherein the second database comprises a snapshot of the fast database.

25. A programmable storage device, readable by a programmable control device, comprising instructions stored thereon for causing the programmable control device to:
   receive a first determination by a user of first and second portions of database data, the first determination of the portions being specifiable by the user;
   select the user-determined first portion of database data at a first time, the first portion comprising less than all the database data;
   generate first set of cyclical redundancy check values based directly on the first portion of database data;
   select the user-determined second portion of database data at a second time, the second portion comprising less than all the database data;
   generate a second set of cyclical redundancy check values based directly on the second portion of database data;
   compare each cyclical redundancy check value in the first set of cyclical redundancy check values with a corresponding cyclical redundancy check value in the second set of cyclical redundancy check values;
   receive a second determination by a user of a first subset of the first portion and a second subset of the second portion of database data, the second determination of the subsets being specifiable by the user;
   select the first subset of the first portion of database data;
   select the second subset of the second portion of database data; and
   display to the user the selected first and second subsets of database data along with differences between corresponding cyclical redundancy check values in the first and second sets.

26. The programmable storage device of claim 25, wherein the database data comprises an entire database.

27. The programmable storage device of claim 26, wherein the entire database comprises a plurality of database tables, each table having one or more rows and one or more columns.

28. The programmable storage device of claim 26, wherein the first and second portions comprise a column in one of the plurality of database tables.

29. The programmable storage device of claim 26, wherein the first and second portions comprise one of the plurality of database tables.

30. The programmable storage device of claim 26, wherein the first and second portions comprise a row in one of the plurality of database tables.

31. The programmable storage device of claim 26, wherein the first and second portions comprise one or more rows from a first table and one or more rows from a second table.

32. The programmable storage device of claim 26, wherein the first and second portions comprise one or more columns from a first table and one or more columns from a second table.

33. The programmable storage device of claim 26, wherein the first and second portions comprise one or more columns and one or more rows from one of the plurality of database tables.

34. The programmable storage device of claim 26, wherein the first and second portions comprise one or more columns and one or more rows from one or more of the plurality of database tables.

35. The programmable storage device of claim 25, wherein the first portion of database data comprises database data in a first database, and wherein the second portion of database data comprises database data in a second database.

36. The programmable storage device of claim 35, wherein the second database comprises a snapshot of the first database.

* * * * *